(12) United States Patent
Shillingburg

(10) Patent No.: US 10,437,757 B2
(45) Date of Patent: Oct. 8, 2019

(54) DETERMINE PRIORITY OF REQUESTS USING REQUEST SIGNALS AND PRIORITY SIGNALS AT AN ARBITRATION NODE

(71) Applicant: Hewlett Packard Enterprise Development LP, Houston, TX (US)

(72) Inventor: Mark Shillingburg, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/789,634

(22) Filed: Oct. 20, 2017

(65) Prior Publication Data

US 2019/0121766 A1 Apr. 25, 2019

(51) Int. Cl.
*G06F 13/364* (2006.01)
*G06F 13/362* (2006.01)
*G06F 13/16* (2006.01)
*G06F 13/374* (2006.01)

(52) U.S. Cl.
CPC ........ *G06F 13/364* (2013.01); *G06F 13/1605* (2013.01); *G06F 13/3625* (2013.01); *G06F 13/374* (2013.01)

(58) Field of Classification Search
CPC .. G06F 13/14; G06F 13/1605; G06F 13/1652; G06F 13/18; G06F 13/20; G06F 13/26; G06F 13/30; G06F 13/34; G06F 13/36; G06F 13/3625; G06F 13/364; G06F 13/368; G06F 13/374
See application file for complete search history.

(56) References Cited

U.S. PATENT DOCUMENTS

| 5,245,603 | A | * | 9/1993 | Newman | ............... H04L 49/205 340/2.2 |
| 5,301,333 | A | | 4/1994 | Lee | |
| 5,968,154 | A | * | 10/1999 | Cho | .................... H04L 12/4135 710/100 |
| 6,996,071 | B2 | | 2/2006 | Perkinson et al. | |
| 7,007,123 | B2 | | 2/2006 | Golla et al. | |
| 7,382,794 | B1 | | 6/2008 | Zheng et al. | |
| 9,117,022 | B1 | * | 8/2015 | Chiu | ..................... G06F 13/364 |

(Continued)

OTHER PUBLICATIONS

Aydin O. Balkan, et al., "Arbitrate-and-move Primitives for High Throughput On-chip Interconnection Networks," Jan. 29, 2004, pp. 1-4, University of Maryland, Maryland, USA.

*Primary Examiner* — Thomas J Cleary
(74) *Attorney, Agent, or Firm* — Park, Vaughan, Fleming & Dowler LLP

(57) ABSTRACT

Example implementations relate to an arbitration node. For example, an arbitration node can include instructions to receive, at the arbitration node at a level of a binary tree structure, a first request including a first request signal and a first priority signal and receive a second request including a second request signal and a second priority signal. In some examples, the arbitration node can include instructions to determine priority of requests by comparing the first request signal and the second request signal and by comparing the first priority signal and the second priority, and send a request signal and a priority signal of the request with the determined priority to a subsequent arbitration node at a subsequent level of the binary tree structure.

18 Claims, 5 Drawing Sheets

(56) References Cited

U.S. PATENT DOCUMENTS

| | | | | |
|---|---|---|---|---|
| 2001/0047446 | A1* | 11/2001 | Liu | G06F 5/065 710/240 |
| 2007/0260792 | A1* | 11/2007 | Pathak | G06F 13/364 710/113 |
| 2011/0208887 | A1* | 8/2011 | Chen | G06F 13/362 710/241 |
| 2011/0238877 | A1* | 9/2011 | Naylor | G06F 13/1663 710/244 |
| 2014/0006665 | A1* | 1/2014 | Amano | G06F 13/362 710/116 |
| 2014/0082239 | A1* | 3/2014 | Laughton | G06F 13/14 710/244 |

* cited by examiner

DETERMINE PRIORITY OF REQUESTS USING REQUEST SIGNALS AND PRIORITY SIGNALS AT AN ARBITRATION NODE

BACKGROUND

An arbitration node can be used to prioritize requests contending for a common resource. An arbitration node can be used in a plurality of applications. In some examples, arbitration nodes can be used in a memory system bus and a network switch design. Arbitration nodes can be implemented in hardware using a binary arbitration tree structure.

DETAILED DESCRIPTION

Figure 1:
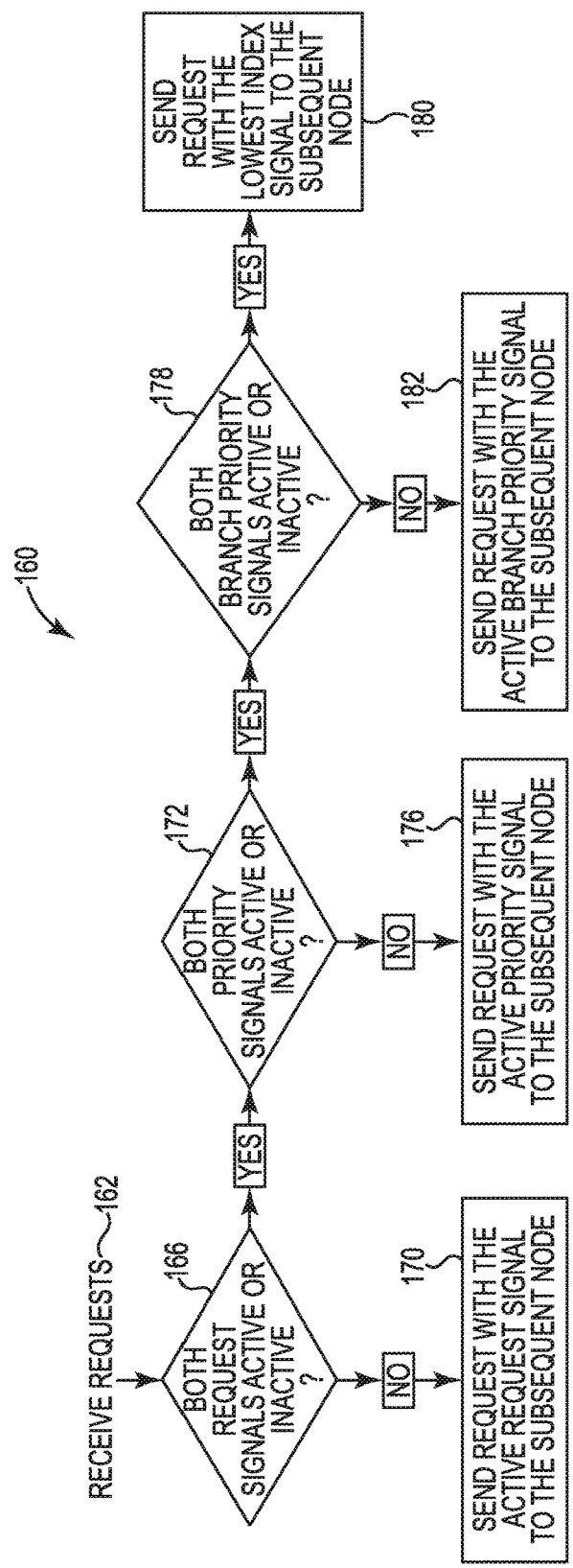
FIG. 1 is a block diagram of an example method for an arbitration node, consistent with the present disclosure.

An arbitration node as described herein can be utilized in a plurality of applications. In some examples, an arbitration node is an arbiter that can choose between competing entities requesting access to a common resource. The arbitration node can be a binary arbitration node where the arbitration node chooses between two competing entities. A plurality of arbitration nodes can be included in a binary tree structure. The plurality of arbitration nodes can be at a plurality of levels of the binary tree structure. A binary tree structure that includes the plurality of arbitration nodes can select a request to receive access to a common resource out of a plurality of requests.

An arbitration node can receive a request from each of a plurality of requesters. A request can include a priority signal that can assist the arbitration node in choosing between competing requests. The priority signal can be propagated on to subsequent nodes to allow each arbitration node to make a decision based on priority settings of the binary tree structure instead of based on priority settings of each individual arbitration node.

In some examples, an arbitration node can receive a first request from a first preceding arbitration node and a second request from a second preceding arbitration node. The first preceding arbitration node and the second preceding arbitration node can be from a preceding level of the binary tree structure. The preceding level can be a level of the binary tree structure before a level of the arbitration node where the first preceding arbitration node and the second preceding arbitration node are choosing a determined priority prior to the arbitration node choosing a determined priority. In some examples, the first request can be a determined priority of the first preceding arbitration node and the second request can be a determined priority of the second preceding arbitration node.

In some examples, an arbitration node can be at a level of a binary tree structure. The arbitration node can receive a first request at the level of the binary tree structure. The first request can be an entity contending for a common resource. The first request can include a first request signal and a first priority signal. In some examples, the arbitration node can receive a second request at the level of the binary tree structure. The second request can include a second request signal and a second priority signal. The second request can be an entity contending for the common resource. An arbitration node can determine a priority between the first request and the second request. A binary tree structure made up of a plurality of arbitration nodes can determine which request of a plurality of requests including the first request and the second request will receive access to the common resource.

The arbitration node can determine a priority of requests by comparing the first request signal and the second request signal. A request signal can be active when an entity needs access to the common resource. In some examples, a device needs access to a common resource such as a server to transmit data over a network. A request signal can be inactive when an entity does not need access to the common resource. In some examples, a device does not need access to the common resource because the device does not need to transmit data. A request with an active request signal can be the determined priority over a request with an inactive request signal because the active request signal needs access to the common resource and the inactive request does not.

In some examples, the arbitration node can determine priority of requests by comparing a first priority signal and a second priority signal. A priority signal can be set based on prior requests receiving access to a common resource, for example. A priority signal of a request can be set prior to a request being inputted into a binary tree structure. A priority signal of a request can prevent or allow particular requests from receiving priority over other requests. In some examples, priority signals can be included in a request and can be propagated throughout the binary tree structure via the request. Instead of, for example, a local priority state maintained by each arbitration node that can lead to the same request being chosen as the determined priority every arbitration.

Priority signals can be propagated throughout the binary tree structure by being included in a request that is the determined priority of requests at an arbitration node. In some examples, a request that is the determined priority of a preceding node in a binary tree structure can be sent, including its priority signal, to an arbitration node on another level if that request is the determined priority of the subsequent arbitration node. If the request is the determined priority at the arbitration node at another level, the request including the priority signal can be sent to a subsequent node at a subsequent level of the binary tree structure. For example, the request along with its priority signal can be propagated to an additional level of the binary tree structure each time the request is the determined priority of an arbitration node.

A first priority signal and a second priority signal can be compared to determine a priority of requests in response to both the first request signal and the second request signal being active or inactive. A priority signal can be active when a request receives priority. In some examples, a request can receive priority as a result of previous requests receiving access to the common resource. In some examples, a request's location relative to a request that received access to the common resource last will receive an active priority signal. For example, the location could refer to the requests location in line with the plurality of requests prior to being inputted into the binary tree structure. In some examples, the same two requests, a first request and a second request, can be compared at an arbitration node for every arbitration because the first request and the second request are located next to each other in line. If the first request has an active request signal and an active branch priority signal and the second request has an active request signal and an inactive branch priority signal, the first request will be the determined priority for every arbitration even though both requests have an active request signal because the first request has branch priority. To prevent the first request from being the determined priority for every arbitration, a priority signal can be included in the requests. In some examples, a request's priority signal can be active when the request is next to a request that last received access to the common resource. For example, if the first request last received access to the common resource, the second request will have an active priority signal and be the determined priority over the first request because the second request has an active priority signal and the first request does not.

A priority signal is inactive when a request does not receive priority. For example, a request may not receive priority as a result of receiving access to the common resource in a previous arbitration cycle. A request with an active priority signal can be the determined priority over a request with an inactive priority signal because the request with the active priority signal has priority to the common resource.

The arbitration node can send a request signal and a priority signal of the request with the determined priority to a subsequent arbitration node of the binary tree structure. The request signal and the priority signal can be sent to the subsequent arbitration node to provide the subsequent arbitration node with information to choose which request at the subsequent arbitration node will be the determined priority. Each arbitration node can send a request with determined priority to a subsequent node at a subsequent level of the binary tree structure until the requests reach a level with a single arbitration node. At the single arbitration node the request granted access to the common resource can be determined. In some examples, the single arbitration node can send the request with the determined priority to an output encoder. The output encoder can grant the request with the determined priority access to the common resource.

FIG. 1 is a block diagram of a method 160 to determine priority of requests, consistent with the present disclosure. For example, the method 160 can be performed by an arbitration node at a level of a binary tree structure to determine the priority of requests.

At 162, the method 160 includes the arbitration node receiving requests. In some examples, the arbitration node can receive requests directly from entities seeking access to a common resource. In some examples, the arbitration node can receive a first request from a first preceding arbitration node and a second request from a second preceding arbitration node. The first preceding arbitration node and the second preceding arbitration node can be from a preceding level of the binary tree structure. The preceding level can be a level of the binary tree structure before a level of the arbitration node where the first preceding arbitration node and the second preceding arbitration node are choosing a determined priority prior to the arbitration node choosing a determined priority. In some examples, the first request can be a determined priority of the first preceding arbitration node and the second request can be a determined priority of the second preceding arbitration node.

At 166, the arbitration node can determine whether both request signals are active or inactive. If the arbitration node determines that the request signals of the requests are different, the arbitration node can send the request with the active request signal to a subsequent node at 170. The request signals are different if one of the request signals is active and another request signal is inactive. The request of the active request signal can be sent to the subsequent node and may receive access to the common resource. The request with the active request signal can be sent to the subsequent node because the active request signal indicates that the entity associated the active request needs access to the common resource. The request of the inactive request signal is not sent to the subsequent node because the inactive request signal indicates that the entity associated with the inactive request does not need access to the common resource.

If the arbitration node determines that both request signals are active or inactive at 166, the arbitration node, as a tie breaker, can determine whether both priority signals of the requests are active or inactive at 172 to determine which request is the determined priority. If the arbitration node determines that the priority signals are different, the arbitration node can send the request with the active priority signal to the subsequent node at 176. The priority signals are different if one of the priority signals is active and another priority signal is inactive. The request of the active priority signal can be sent to the subsequent node and may receive access to the common resource because the active priority signal indicates that the entity associated with the active priority signal needs access to the common resource over an entity associated with an inactive priority signal. An entity may be given an active priority signal to prevent certain requests from continuing to receive access to the common resource over other requests.

If, at 172, the arbitration node determines that the priority signals are both active or inactive, the arbitration node can determine whether both branch priority signals of the requests are active or inactive at 178. A request can have an active branch priority signal because the entity associated with the request may be more important than other entities and/or may need access to the common resource more frequently than other entities, for example. If the arbitration node determines that the branch priority signals are different, the arbitration node can send the request with the active branch priority signal to the subsequent node at 182. The branch priority signals are different if one of the branch priority signals is active and another branch priority signal is inactive. The request of the active branch priority signal can be sent to the subsequent node and may receive access to the common resource because the active branch priority signal indicates that the entity associated with the active branch priority signal needs access to the common resource over an entity associated with an inactive branch priority signal.

If the arbitration node determines at 178 that both branch priority signals of the requests are active or inactive, the arbitration node can send the request with the lowest index signal to the subsequent node at 180. The index signal can be a value that represents the number of times an entity has received access to the common resource. The index signal of a request can be tracked using a counter. Each time a request receives access to the common resource the index signal's value is increased by a particular increment. The request with the lowest index signal can be sent to the subsequent node and may receive access to the common resource because the lowest index signal indicates that the entity associated with the lowest index signal has been granted access to the common resource fewer times than the other entity.

The method 160 to determine priority of requests can be performed by a plurality of arbitration nodes at a plurality of levels of a binary tree structure. The method 160 can allow a priority signal of a request that was inputted into the binary tree structure and propagated throughout the binary tree structure to be utilized when choosing a determined priority by the arbitration node. The method 160 can allow the priority signal of a request to be different each time the arbitration node receives the request. Since the arbitration node receives the priority signal, the arbitration node does not need to maintain a local priority state. The local priority state can lead to the same request being chosen as the determined priority at every arbitration.

Figure 2:
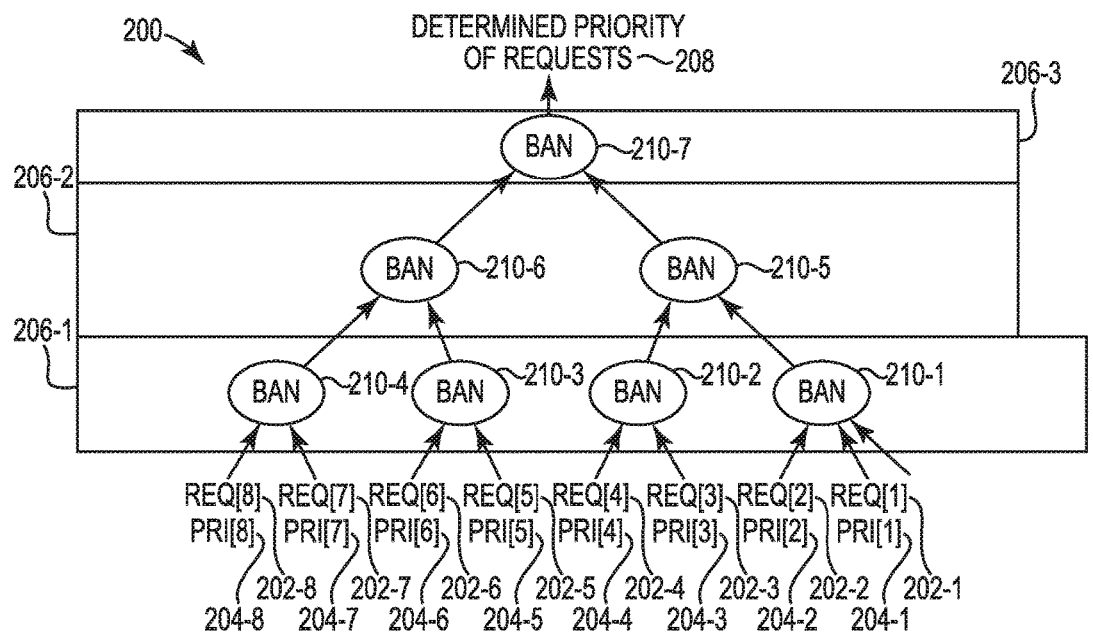
FIG. 2 illustrates an example binary arbitration tree structure, consistent with the present disclosure.

FIG. 2 illustrates an example binary arbitration tree structure 200, consistent with the present disclosure. The binary arbitration tree structure 200 can include a plurality of binary arbitration nodes 210-1, . . . , 210-7. The plurality of binary arbitration nodes 210-1, . . . , 210-7 can be located on a plurality of levels 206-1, . . . , 206-3 of the binary arbitration tree structure 200. In some examples, binary arbitration nodes 210-1, 210-2, 210-3, and 210-4 can be on level 206-1, binary arbitration nodes 210-5 and 210-6 can be on level 206-2, and binary arbitration node 210-7 can be on level 206-3 of the binary arbitration tree structure 200.

A plurality of request signals 202-1, . . . , 202-8 and a plurality of priority signals 204-1, . . . , 204-8 can be inputted into the binary arbitration tree structure 200 at a level 206-1. The plurality of request signals 202-1, . . . 202-8 can be signals that indicate whether an entity associated with a request needs access to a common resource (e.g., network, server, etc.). The priority signals 204-1, . . . , 204-8 can be signals that indicate whether the request is to receive preference in the arbitration process. For example, the priority signals 204-1, . . . , 204-8 can indicate whether the entity associated with the priority signal needs access to the common resource over another entity. The plurality of request signals 202-1, . . . , 202-8 and the plurality of priority signals 204-1, . . . , 204-8 can be sent to a plurality of binary arbitration nodes 210-1, . . . 210-7.

The plurality of binary arbitration nodes 210-1, . . . , 210-7 can determine priority of a plurality of signals, including the plurality of request signals 202-1, . . . , 202-8 and the plurality of priority signals 204-1, . . . , 204-8, of each request at a plurality of levels 206-1, . . . , 206-3. In some examples, the first binary arbitration node 210-1 can determine whether both the first request signal 202-1 and the second request signal 202-2 are active or inactive. For example, a request signal is active when the request signal is on and/or within a first signal range and a request signal is inactive when the request signal is off and/or within a second signal range. If the first arbitration node 210-1 determines that the first request signal 202-1 and the second request signal 202-2 are different, the arbitration node can send the request with the active request signal to a subsequent node. For example, a first arbitration node 210-1 at level 206-1 can send the request with the active request signal to a fifth arbitration node 210-5 at level 206-2 of the binary arbitration tree structure 200.

In some examples, the first binary arbitration node 210-1 can determine that the first request signal 202-1 and the second request signal 202-2 are the same. For example, the first request signal 202-1 and the second request signal can be the same if both the first request signal 202-1 and the second request signal 202-2 are active or inactive. When the first request signal 202-1 and the second request signal 202-2 are the same, the arbitration node 210-1 can determine whether the first priority signal 204-1 and the second priority signal 204-2 are both active or inactive. For example, a priority signal is active when the priority signal is on and/or within a first signal range and a priority signal is inactive when the priority signal is off and/or within a second signal range. If the arbitration node 210-1 determines that the first priority signal 204-1 and the second priority signal 204-2 are different, the first arbitration node 210-1 can send the request with the active priority signal to the subsequent node, for example the fifth arbitration node 210-5 at level 206-2 of the binary arbitration tree structure 200. If the arbitration node 210-1 determines that the first priority signal 204-1 and the second priority signal 204-2 are both active or inactive, the arbitration node 210-1 can determine priority based on branch priority signals and/or index signals, as discussed in FIG. 1.

A determined priority of the requests 208 can be determined at a subsequent level 206-3. The determined priority of the requests 208 can be the request that receives access to the common resource. The determined priority of the requests 208 can be determined in one clock cycle of the binary arbitration tree structure 200. A clock cycle can be the length of the entire arbitration process of the binary arbitration tree structure 200. For example, the clock cycle can start when the binary arbitration tree structure 200 receives the requests at level 206-1 of the binary arbitration tree structure and can end when the determined priority of the requests 208 is outputted from the binary arbitration tree structure.

In some examples, the plurality of priority signals 204-1, . . . , 204-8 can change from a first clock cycle to a second clock cycle. The plurality of priority signals of the second clock cycle can be based on the determined priority of the requests 208 of the first clock cycle. For example, the plurality of priority signals 204-1, . . . , 204-8 can be reset by indexing from the request that was the determined priority of requests 208 after each clock cycle. Indexing from the request that was the determined priority of requests 208 after each clock cycle is one example of how the plurality of priority signals 204-1, . . . , 204-8 can be changed. In some examples, the plurality of priority signals 204-1, . . . , 204-8 can be changed after a plurality of clock cycles instead of after each clock cycle.

The binary tree structure 200 can include a plurality of binary arbitration nodes 210-1, . . . , 210-7 on a plurality of levels 206-1, . . . , 206-3 of the binary arbitration tree structure 200. Priority of requests can be determined by the plurality of arbitration nodes 210-1, . . . , 210-7. The binary tree structure 200 can allow the plurality of priority signals 202-1, . . . , 202-8 that were inputted into the binary tree structure 200 and propagated throughout the binary tree structure 200 to be included in choosing determined priorities by arbitration nodes 210-1, . . . , 210-7. The binary tree structure 200 can allow the plurality of priority signals 204-1, . . . , 204-8 to be different each time an arbitration node of the plurality of arbitration nodes 210-1, . . . , 210-7 receives a request.

Figure 3:
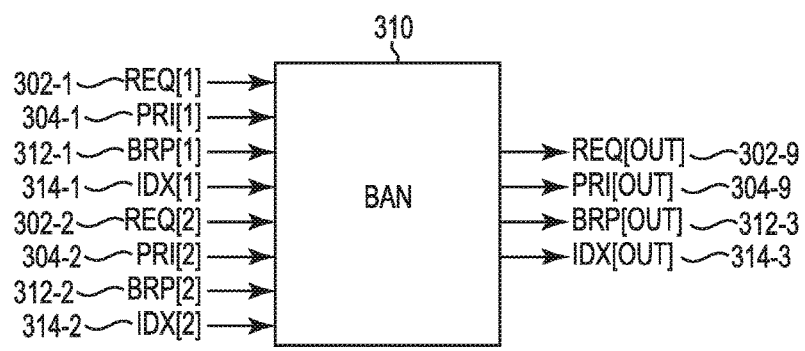
FIG. 3 illustrates an example arbitration node, consistent h the present disclosure.

FIG. 3 illustrates an example arbitration node 310, consistent with the present disclosure. The arbitration node 310 can be located at a level of the plurality of levels (e.g. plurality of levels 206-1, . . . , 206-3 in FIG. 2) of a binary tree structure (e.g. binary tree structure 200 in FIG. 2). The arbitration node 310 can receive a first request including a first request signal 302-1 and a first priority signal 304-1 and a second request including a second request signal 302-2 and a second priority signal 304-2. In some examples, the first request and the second request can be requests from entities contending for a common resource. The common resource can be a network, for example, to transmit data. For example, the first request can be from a first device and the second request can be from a second device seeking access to the network to transmit data. The arbitration node 310 can determine a priority of the requests by comparing the first request signal 302-1 and the second request signal 302-2. A request with an active request signal can be the determined priority over a request with an inactive request signal.

In some examples, the arbitration node 310 can determine a priority of the requests by comparing the first priority signal 304-1 and the second priority signal 304-2 in response to both the first request signal 302-1 and the second request signal 302-2 being active or inactive. A request with an active priority signal can be the determined priority over a request with an inactive priority signal. The arbitration node 310 can send a request signal 302-9 and a priority signal 304-9 of the request with the determined priority to a subsequent arbitration node at a subsequent level of the binary tree structure (e.g. binary tree structure 200 in FIG. 2). In some examples, the arbitration node 310 can send the request with the determined priority to an output encoder to grant the request with the determined priority access to the common resource.

As used herein, the term "priority" can, for example, refer to a first request that is preferred to be granted access to the common resource over a second request. A request may receive priority because the entity associated with the request may be more important and/or needs access to the common resource more frequently than other entities. The request signals and the priority signals can provide information to the arbitration node 310 to assist the arbitration node 310 in deciding which request should receive priority. Specifically, the arbitration node 310 can receive a first request signal 302-1, a first priority signal 304-1, a first branch priority signal 312-1, and a first index signal 314-1 associated with a first request and a second request signal 302-2, a second priority signal 304-2, a second branch priority signal 312-2, and a second index signal 314-2 associated with a second request to determine which request receives priority.

A request can indicate priority by having an active priority signal and/or an active branch priority signal. For example, a priority signal is active when the priority signal is on and/or within a first priority signal range and a priority signal is inactive when the priority signal is off and/or within a second priority signal range. A branch priority signal is active when the branch priority signal is on and/or within a first branch priority signal range and a branch priority signal is inactive when the branch priority signal is off and/or within a second branch priority signal range. In some examples, a request's location relative to a request that received access to the common resource in the previous clock cycle can receive priority over other requests and can indicate priority via an active priority signal and/or a lower index signal. For example, if the first request including first request signal 302-1 and first priority signal 304-1 received access to the common resource, the second request including second request signal 302-2 and second priority signal 304-2 can receive priority by the second priority signal 304-2 being active because of its location next to the first request.

In some examples, the first priority signal 304-1 and the second priority signal 304-2 can be set prior to starting a clock cycle of arbitration in the binary tree structure (e.g. binary tree structure 200 in FIG. 2). For example, the first priority signal 304-1 and the second priority signal 304-2 can be set based on a determined priority of requests of a previous clock cycle then inputted into arbitration in the binary tree structure. The first priority signal 304-1 and the second priority signal 304-2 can be set after a plurality of clock cycles. For example, the first priority signal 304-1 and the second priority signal 304-2 can be set based on a plurality of determined priority of requests of a plurality of previous clock cycles then inputted into arbitration in the binary tree structure.

The first request can include a first branch priority signal 312-1 and the second request can include a second branch priority signal 312-2. A branch priority signal can indicate which branch of the binary tree structure (e.g. binary tree structure 200 in FIG. 2) receives priority. An active branch priority signal indicates that the branch of the binary tree structure that the active priority signal is on should receive priority. A branch of the binary tree structure can be a request. The first branch priority signal 312-1 and the second branch priority signal 312-2 can be compared at the arbitration node 310. The arbitration node 310 can use the first branch priority signal 312-1 and the second branch priority signal 312-2 when priority cannot be determined using the first request signal 302-1 and the second request signal 302-2 and/or the first priority signal 304-1 and the second priority signal 304-2.

In some examples, priority cannot be determined using the first request signal 302-1 and the second request signal 302-2 because the first request signal 302-1 and the second request signal 302-2 are the same. The first request signal 302-1 and the second request signal 302-2 are the same when the first request signal 302-1 and the second request signal 302-2 are both active or inactive. For example, a request signal is active when the request signal is on and/or within a first request signal range and a request signal is inactive when the request signal is off and/or within a second request signal range.

In some examples, priority cannot be determined using the first priority signal 304-1 and the second priority signal 304-2 because the first priority signal 304-1 and the second priority signal 304-2 are the same. The first priority signal 304-1 and the second priority signal 304-2 are the same when the first priority signal 304-1 and the second priority signal 304-2 are both active or inactive. For example, a priority signal is active when the priority signal is on and/or within a first priority signal range and a priority signal is inactive when the priority signal is off and/or within a second priority signal range.

In some examples, a request with an active branch priority signal can be the determined priority. For example, a branch priority signal is active when the branch priority signal is on and/or within a first branch priority signal range and a branch priority signal is inactive when the branch priority signal is off and/or within a second branch priority signal range. The request with the active branch priority signal can be sent to the subsequent arbitration node. The request including the branch priority signal 312-3 of the determined priority can be sent to the subsequent arbitration node at the subsequent level of the binary tree structure.

The first request can include a first index signal 314-1 and the second request can include a second index signal 314-2. An index signal can represent number of times a request has been the determined priority of requests and/or number of times the request has received access to the common resource. The first index signal 314-1 and the second index signal 314-2 can be compared at the arbitration node 310 at the level of the binary tree structure (e.g. binary tree structure 200 in FIG. 2) in response to both the first branch priority signal 312-1 and the second branch priority signal 312-2 being active or inactive. In some examples, a request with the lowest index signal is the determined priority because the request with the lowest index signal indicates that the entity and/or request associated with the lowest index signal has been granted access to the common resource fewer times than the other entities and/or requests. The index signal 314-3 of the determined priority can be sent to the subsequent arbitration node at the subsequent level of the binary tree structure.

The arbitration node 310 can receive a first request from a first entity and a second request from a second entity competing to receive access to the common resource. The arbitration node 310 can receive the first request from a first preceding arbitration node. The arbitration node 310 can receive the second request from a second preceding arbitration node. For example, the first preceding arbitration node can be binary arbitration node 210-1, the second preceding arbitration node can be binary arbitration node 210-2, and the arbitration node can be arbitration node 210-5, as shown in FIG. 2. The first preceding arbitration node and the second preceding arbitration node can be from a preceding level of the binary tree structure. For example, the preceding level of the binary tree structure can be level 206-1, as shown in FIG. 2. In some examples, the first request can be a determined priority of the first preceding arbitration node from the preceding level of the binary tree structure. The second request can be a determined priority of the second preceding arbitration node from the preceding level of the binary tree structure.

A binary tree structure (e.g. binary tree structure 200 in FIG. 2) can include a plurality of arbitration nodes (e.g. plurality of arbitration nodes 210-1, . . . , 210-7 in FIG. 2). The plurality of arbitration nodes can include the first preceding arbitration node, the second preceding arbitration node, the arbitration node, and/or the subsequent arbitration node. The plurality of arbitration nodes can use same and/or different types of priority to determine the priority of requests. For example, strict priority, round robin priority, and/or first come, first served priority can be used to determine the priority of requests. Strict priority sets a designated request with an active priority signal. Round robin priority sets the priority signal of the request that last received access to the common resource as inactive and the request next to it with an active signal. First come, first served priority can set an active priority signal for the request that has not received access to the common resource with the highest number of active request signals. The number of active requests can be reset to zero after the request receives access to the common resource.

The arbitration node 310 can be located at a level of the plurality of levels (e.g. plurality of levels 206-1, . . . , 206-3 as illustrated in FIG. 2) of a binary tree structure (e.g. binary tree structure 200 in FIG. 2). The arbitration node 310 can allow the priority signals 304-1 and 304-2 that were inputted into the binary tree structure and propagated throughout the binary tree structure to be included in choosing a determined priority by the arbitration node 310. The arbitration node 310 can allow the priority signals 304-1 and 304-2 to be different each time the arbitration node 310 receives the requests.

Figure 4:
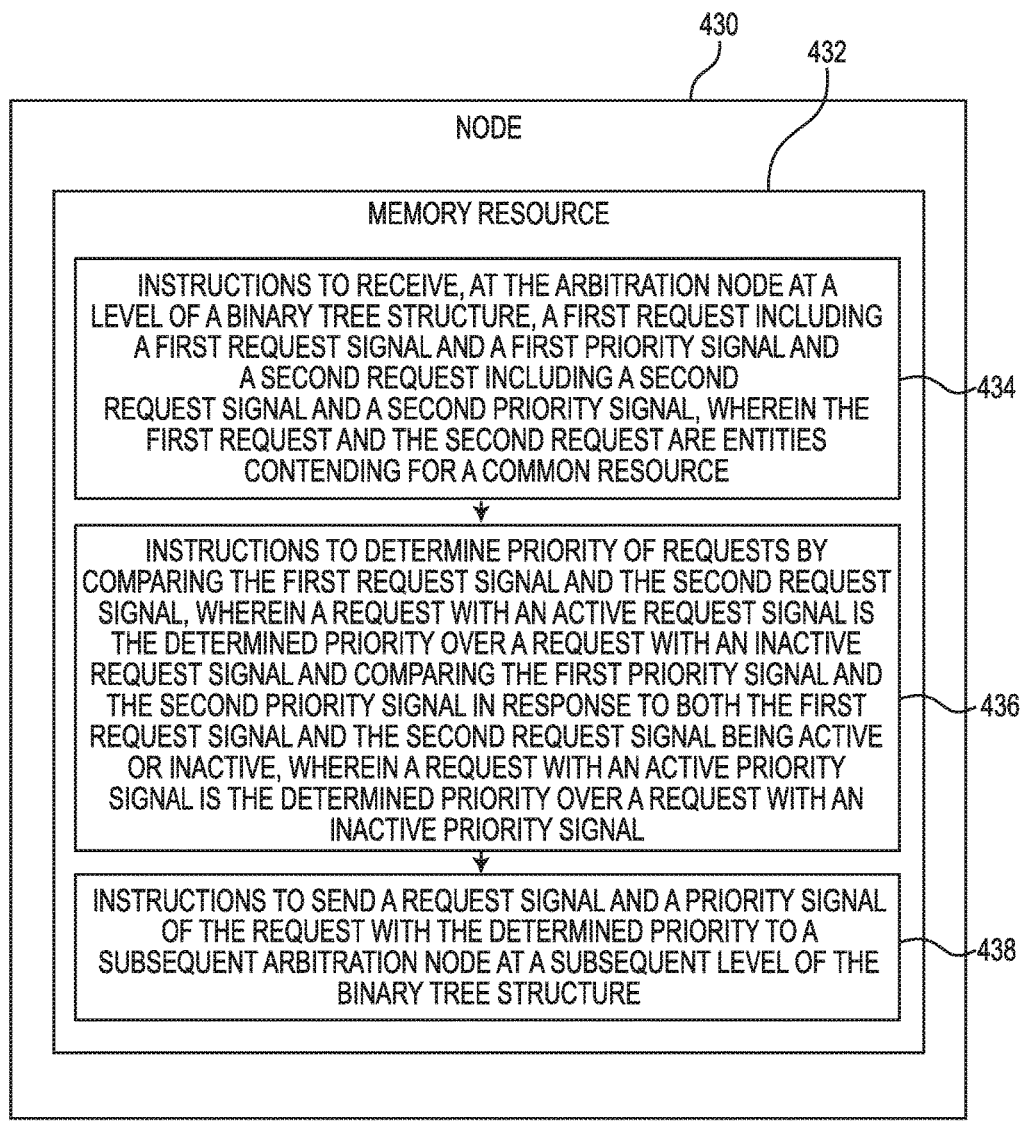
FIG. 4 is a block diagram of an example arbitration node for determining priority of requests, consistent with the present disclosure.

FIG. 4 is a block diagram of an example node 430 for determining priority of requests, consistent with the present disclosure. In some examples, the node 430 can be a binary arbitration node as referenced in FIG. 1, FIG. 2 and/or FIG. 3. In some examples, the node 430 can include a memory resource 432 that can be utilized to store instructions 434, 436, 438 that can be executed by a processing resource to perform functions described herein.

A processing resource may be a central processing unit (CPU), microprocessor, and/or other hardware device suitable for retrieval and execution of instructions stored in memory resource 432. In the particular example shown in FIG. 4, processing resource may set instructions 434, 436, 438. As an alternative or in addition to retrieving and executing instructions 434, 436, 438, processing resource may include an electronic circuit comprising a number of electronic components for performing the operations of the instructions 434, 436, 438, in the memory resource 432. With respect to the executable instruction representations or boxes described and shown herein, it should be understood that part or all of the executable instructions 434, 436, 438 and/or electronic circuits included within one box may be included in a different box shown in the figures or in a different box not shown.

Memory resource 432 may be, for example, Random Access Memory (RAM), an Electrically-Erasable Programmable Read-Only Memory (EEPROM), a storage drive, an optical disc, and the like. The executable instructions 434, 436, 438 may be stored on the memory resource 432. Memory resource 432 may be a portable, external or remote storage medium, for example, that allows the system to download the instructions 434, 436, 438 from the portable/external/remote storage medium. In this situation, the executable instructions 434, 436, 438 may be part of an "installation package". As described herein, memory resource 432 may be encoded with executable instructions 434, 436, 438 for determining priority of requests.

The node 430 may include instructions 434 executable by a processing resource, to receive, at the arbitration node (e.g. arbitration node 310 in FIG. 3) at a level of a binary tree structure (e.g. binary tree structure 200 in FIG. 2), a first request including a first request signal (e.g. first request signal 302-1 in FIG. 3) and a first priority signal (e.g. first priority signal 304-1 in FIG. 3) and a second request including a second request signal (e.g. second request signal 302-2 in FIG. 3) and a second priority signal (e.g. second priority signal 304-2 in FIG. 3), wherein the first request and the second request are entities contending for a common resource.

The first priority signal (e.g. first priority signal 304-1 in FIG. 3) and the second priority signal (e.g. second priority signal 304-2 in FIG. 3) can be set prior to arbitration in the binary tree structure (e.g. binary tree structure 200 in FIG. 2). In some examples, the first priority signal and the second priority signal can be set prior to starting a clock cycle of arbitration in the binary tree structure. For example, the first priority signal and the second priority signal can be set based on a determined priority of requests of a previous clock cycle then inputted into arbitration in the binary tree structure. In some examples, the first priority signal and the second priority signal can be set after a plurality of clock cycles. For example, the first priority signal and the second priority signal can be set based on a plurality of determined priority of requests of a plurality of previous clock cycles then inputted into arbitration in the binary tree structure.

In some examples, the node 430 may include instructions executable by a processing resource, to receive, at the arbitration node (e.g. arbitration node 310 in FIG. 3) at a level of a binary tree structure (e.g. binary tree structure 200 in FIG. 2), a first request including a first branch priority signal (e.g. first branch priority signal 312-1 in FIG. 3) and the second request including a second branch priority signal (e.g. second branch priority signal 304-2 in FIG. 3).

In some examples, the node 430 may include instructions executable by a processing resource, to receive, at the arbitration node (e.g. arbitration node 310 in FIG. 3) at a level of a binary tree structure (e.g. binary tree structure 200 in FIG. 2), a first request including a first index signal (e.g. first index signal 314-1 in FIG. 3) and a second request including a second index signal (e.g. second index signal 314-2 in FIG. 3). An index signal can indicate a number of times a request has received access to the common resource, for example.

The node 430 may include instructions 436 executable by a processing resource, to determine priority of requests by comparing the first request signal (e.g. first request signal 302-1 in FIG. 3) and the second request signal (e.g. second request signal 302-2 in FIG. 3), wherein a request with an active request signal is the determined priority over a request with an inactive request signal and comparing the first priority signal (e.g. first priority signal 304-1 in FIG. 3) and the second priority signal (e.g. second priority signal 304-2 in FIG. 3) in response to both the first request signal and the second request signal being active or inactive, wherein a request with an active priority signal is the determined priority over a request with an inactive priority signal.

A request signal can be active when an entity needs access to the common resource. For example, a request signal is active when the request signal is on and/or within a first request signal range. In some examples, an entity needs access to a common resource such as a server to transmit data over a network. A request signal can be inactive when an entity does not need access to the common resource. For example, a request signal is inactive when the request signal is off and/or within a second request signal range. In some examples, an entity does not need access to the common resource because the entity does not need to transmit data.

A priority signal can be active when a request receives priority. For example, a priority signal is active when the priority signal is on and/or within a first priority signal range. In some examples, a request can receive priority as a result of previous requests receiving access to the common resource. In some examples, a request's location relative to a request that received access to the common resource last will receive an active priority signal. For example, the location could refer to the requests location in line with the plurality of requests prior to being inputted into the binary tree structure. A priority signal is inactive when a request does not receive priority. For example, a priority signal is inactive when the priority signal is off and/or within a second priority signal range. A request may not receive priority as a result of receiving access to the common resource in the previous arbitration cycle.

In some examples, the node 430 may include instructions executable by a processing resource, to determine priority of requests by comparing the first branch priority signal (e.g. first branch priority signal 312-1 in FIG. 3) and the second branch priority signal (e.g. second branch priority signal 312-2 in FIG. 3) in response to both the first priority signal (e.g. first priority signal 304-1 in FIG. 3) and the second priority signal (e.g. second priority signal 304-2 in FIG. 3) being active or inactive, wherein a request with an active branch priority signal is the determined priority over a request with an inactive branch priority signal.

An active branch priority signal indicates that the branch of the binary tree structure (e.g. binary tree structure 200 in FIG. 2) that the active priority signal is on should receive priority. A branch of the binary tree structure can be a request. In some examples, a branch priority signal is active when the branch priority signal is on and/or within a first branch priority signal range and a branch priority signal is inactive when the branch priority signal is off and/or within a second branch priority signal range. The request with the active branch priority signal can be sent to the subsequent arbitration node.

In some examples, the node 430 may include instructions executable by a processing resource, to determine priority of requests by comparing the first index signal (e.g. first index signal 314-1 in FIG. 3) and the second index signal (e.g. second index signal 314-2 in FIG. 3) in response to both the first branch priority signal (e.g. first branch priority signal 312-1 in FIG. 3) and the second branch priority signal (e.g. second branch priority signal 312-2 in FIG. 3)*being* active or inactive, wherein a request with a lowest index signal is the determined priority.

The node 430 may include instructions 438 executable by a processing resource, to send a request signal and a priority signal of the request with the determined priority to a subsequent arbitration node at a subsequent level of the binary tree structure. The request signal and the priority signal of the request with the determined priority can be sent to the subsequent arbitration node to provide the subsequent arbitration node with information to choose which request at the subsequent arbitration node will be the determined priority.

In some examples, the node 430 may include instructions executable by a processing resource, to send a branch priority signal of the determined priority to a subsequent arbitration node of a subsequent level of the binary tree structure. The branch priority signal of the request with the determined priority can be sent to the subsequent arbitration node to provide the subsequent arbitration node with information to choose which request at the subsequent arbitration node will be the determined priority.

In some examples, the node 430 may include instructions executable by a processing resource, to send an index signal of the determined priority to a subsequent arbitration node of a subsequent level of the binary tree structure. The index signal of the request with the determined priority can be sent to the subsequent arbitration node to provide the subsequent arbitration node with information to choose which request at the subsequent arbitration node will be the determined priority.

Figure 5:
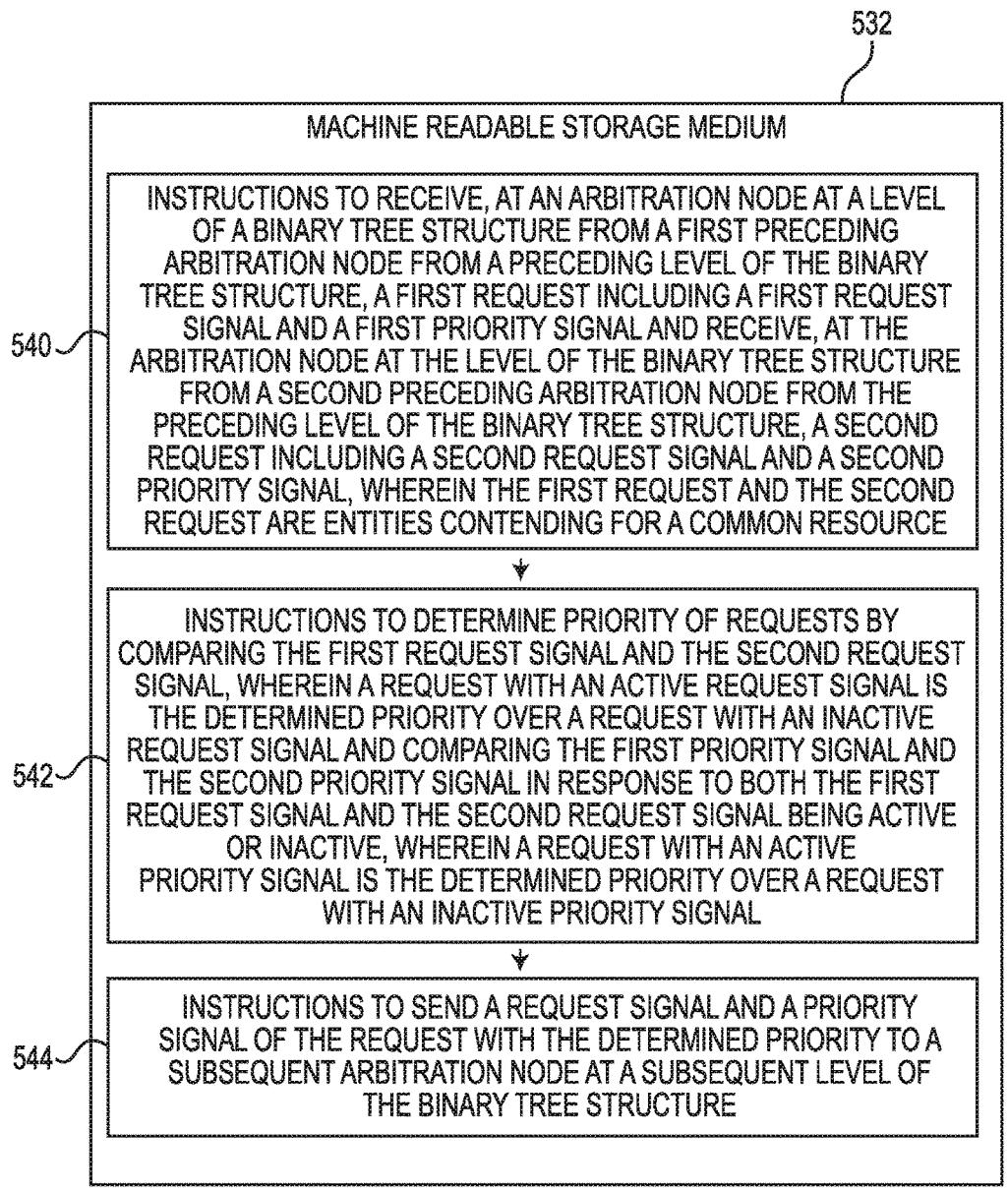
FIG. 5 is a block diagram of an example machine readable storage medium for an arbitration node, consistent with the present disclosure.

FIG. 5 is a block diagram of an example machine readable storage medium 532 for an arbitration node (e.g. arbitration node 310 in FIG. 3), consistent with the present disclosure. In some examples, the machine readable storage medium 532 can be the same or similar to memory resource 432 as referenced in FIG. 4. For example, machine readable storage medium 532 can be utilized to store instructions 540, 542, 544 by a node. As described herein, the instructions 540, 542, 544 can be executed by a processor to perform a number of functions described herein.

In some examples, the machine readable storage medium 532 can include instructions 540 executable by a processing resource, to receive, at an arbitration node (e.g. arbitration node 310 in FIG. 3) at a level of a binary tree structure (binary tree structure 200 in FIG. 2) from a first preceding arbitration node from a preceding level of the binary tree structure, a first request including a first request signal (e.g. first request signal 302-1 in FIG. 3) and a first priority signal (e.g. first priority signal 304-1 in FIG. 3) and receive, at the arbitration node at the level of the binary tree structure from a second preceding arbitration node from the preceding level of the binary tree structure, a second request including a second request signal (e.g. second request signal 302-2 in FIG. 3) and a second priority signal (e.g. second priority signal 304-2 in FIG. 3), wherein the first request and the second request are entities contending for a common resource.

The first priority signal (e.g. first priority signal 304-1 in FIG. 3) and the second priority signal (e.g. second priority signal 304-2 in FIG. 3) can be set prior to arbitration in the binary tree structure (e.g. binary tree structure 200 in FIG. 2). In some examples, the first priority signal and the second priority signal can be set prior to starting a clock cycle of arbitration in the binary tree structure. For example, the first priority signal and the second priority signal can be set based on a determined priority of requests of a previous clock cycle then inputted into arbitration in the binary tree structure. In some examples, the first priority signal and the second priority signal can be set after a plurality of clock cycles. For example, the first priority signal and the second priority signal can be set based on a plurality of determined priority of requests of a plurality of previous clock cycles then inputted into arbitration in the binary tree structure.

In some examples, the machine readable storage medium 532 can include instructions 542 executable by a processing resource, to determine priority of requests by comparing the first request signal (e.g. first request signal 302-1 in FIG. 3) and the second request signal (e.g. second request signal 302-2), wherein a request with an active request signal is the determined priority over a request with an inactive request signal and comparing the first priority signal (e.g. first priority signal 304-1 in FIG. 3) and the second priority signal (e.g. second priority signal 304-2 in FIG. 3) in response to the first request signal and the second request signal both being active or inactive, wherein a request with an active priority signal is the determined priority over a request with an inactive priority signal.

A request signal can be active when an entity needs access to the common resource. For example, a request signal is active when the request signal is on and/or within a first request signal range. In some examples, an entity needs access to a common resource such as a server to transmit data over a network. A request signal can be inactive when an entity does not need access to the common resource. For example, a request signal is inactive when the request signal is off and/or within a second request signal range. In some examples, an entity does not need access to the common resource because the entity does not need to transmit data.

A priority signal can be active when a request receives priority. For example, a priority signal is active when the priority signal is on and/or within a first priority signal range. In some examples, a request can receive priority as a result of previous requests receiving access to the common resource. In some examples, a request's location relative to a request that received access to the common resource last will receive an active priority signal. For example, the location could refer to the requests location in line with the plurality of requests prior to being inputted into the binary tree structure. A priority signal is inactive when a request does not receive priority. For example, a priority signal is inactive when the priority signal is off and/or within a second priority signal range. A request may not receive priority as a result of receiving access to the common resource in the previous arbitration cycle.

The plurality of arbitration nodes (e.g. plurality of arbitration nodes 210-1, . . . , 210-7 in FIG. 2) can use same and/or different types of priority to determine the priority of requests. For example, strict priority, round robin priority, and/or first come, first served priority can be used to determine the priority of requests. In some examples, at least one of a first preceding arbitration node, a second preceding arbitration node, an arbitration node, or a subsequent arbitration node use strict priority to determine priority of requests. In some examples, at least one of a first preceding arbitration node, a second preceding arbitration node, an arbitration node, or a subsequent arbitration node use round robin priority to determine priority of requests. In some examples, at least one of a first preceding arbitration node, a second preceding arbitration node, an arbitration node, or a subsequent arbitration node use first come, first served priority to determine priority of requests.

In some examples, the machine readable storage medium 532 can include instructions 544 executable by a processing resource, to send a request signal and a priority signal of the request with the determined priority to a subsequent arbitration node at a subsequent level of the binary tree structure. A request signal and a priority signal of a request with determined priority can be sent to the subsequent arbitration node to provide the subsequent arbitration node with information to choose which request at the subsequent arbitration node will be the determined priority.

Figure 6:
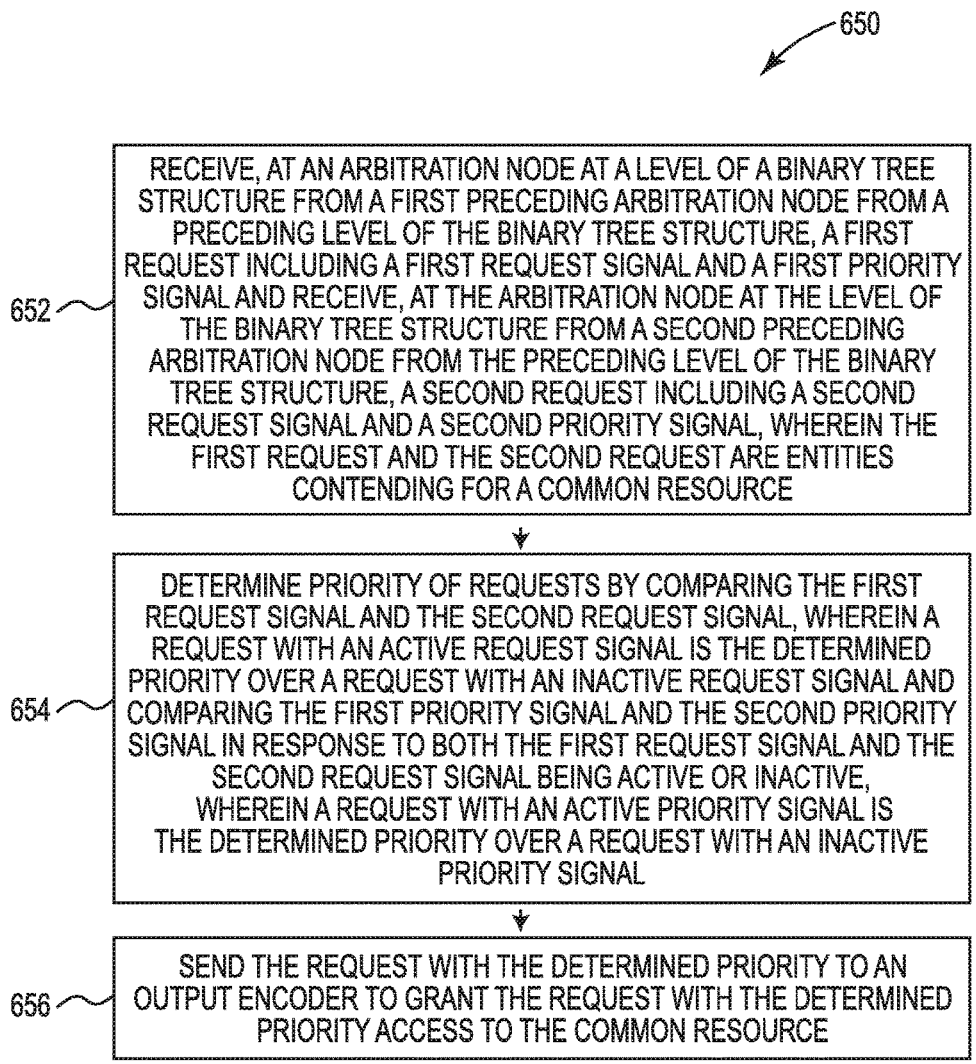
FIG. 6 is a block diagram of an example method for an arbitration node, consistent with the present disclosure.

FIG. 6 is a block diagram of an example method 650 for an arbitration node, consistent with the present disclosure. In some examples, the method 650 can be performed in RAM, parallel processing, a memory system bus, and/or a network switch design. For example, the method 650 can be executable instructions that can cause a processor to perform a number of functions described herein.

At box 652, the method 650 can include receiving, at an arbitration node (e.g. arbitration node 310 in FIG. 3) at a level of a binary tree structure (e.g. binary tree structure 200 in FIG. 2) from a first preceding arbitration node from a preceding level of the binary tree structure, a first request including a first request signal (e.g. first request signal 302-1 in FIG. 3) and a first priority signal (e.g. first priority signal 304-1 in FIG. 3) and receiving, at the arbitration node at the level of the binary tree structure from a second preceding arbitration node from the preceding level of the binary tree structure, a second request including a second request signal (e.g. second request signal 302-2 in FIG. 3) and a second priority signal (e.g. second priority signal 304-2 in FIG. 3), where the first request and the second request are entities contending for a common resource.

In some examples, a first priority signal (e.g. first priority signal 304-1 in FIG. 3) and a second priority signal (e.g. second priority signal 304-2 in FIG. 3) can be set prior to arbitration in the binary tree structure (e.g. binary tree structure 200 in FIG. 2). The first priority signal and the second priority signal can be set after a clock cycle and prior to starting another clock cycle of arbitration in the binary tree structure. The first priority signal and the second priority signal can be set based on a determined priority of requests of a previous clock cycle then inputted into arbitration in the binary tree structure. For example, the first priority signal and the second priority signal for a second clock cycle can be set based on the request with the determined priority of the first clock cycle.

In some examples, the first priority signal and the second priority signal can be set after a plurality of clock cycles. For example, the first priority signal and the second priority signal can be set based on a plurality of determined priority of requests of a plurality of previous clock cycles then inputted into arbitration in the binary tree structure.

At box 654, the method 650 can include determining priority of requests by comparing the first request signal (e.g. first request signal 302-1 in FIG. 3) and the second request signal (e.g. second request signal 302-2 in FIG. 3), wherein a request with an active request signal is the determined priority over a request with an inactive request signal and comparing the first priority signal (e.g. first priority signal 304-1 in FIG. 3) and the second priority signal (e.g. second priority signal 304-2 in FIG. 3) in response to both the first request signal and the second request signal being active or inactive, wherein a request with an active priority signal is the determined priority over a request with an inactive priority signal.

A request signal can be active when an entity needs access to the common resource. For example, a request signal is active when the request signal is on and/or within a first request signal range. In some examples, an entity needs access to a common resource such as a server to transmit data over a network. A request signal can be inactive when an entity does not need access to the common resource. For example, a request signal is inactive when the request signal is off and/or within a second request signal range. In some examples, an entity does not need access to the common resource because the entity does not need to transmit data.

A priority signal can be active when a request receives priority. For example, a priority signal is active when the priority signal is on and/or within a first priority signal range. In some examples, a request can receive priority as a result of previous requests receiving access to the common resource. In some examples, a request's location relative to a request that received access to the common resource last will receive an active priority signal. For example, the location could refer to the requests location in line with the plurality of requests prior to being inputted into the binary tree structure. A priority signal is inactive when a request does not receive priority. For example, a priority signal is inactive when the priority signal is off and/or within a second priority signal range. A request may not receive priority as a result of receiving access to the common resource in the previous arbitration cycle.

At box 656, the method 650 can include sending the request with the determined priority to an output encoder to grant the request with the determined priority access to the common resource. A request signal and a priority signal of the request with determined priority can be sent to a subsequent arbitration node to provide the subsequent arbitration node with information to choose which request at the subsequent arbitration node will be the determined priority.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, can indicate that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. An arbitration node, comprising:
   a processing resource; and
   a memory resource storing machine readable instructions to cause the processing resource to:
   receive, at the arbitration node at a level of a binary tree structure, a first and second requests sent by respective first and second entities contending for a common resource, wherein the first request includes at least a first priority signal, a first branch priority signal, and a first index signal, and wherein the second request includes a second priority signal, a second branch priority signal, and a second index signal;
   wherein a respective priority signal indicates a priority of a corresponding request, wherein a respective branch priority signal indicates a priority of a corresponding branch of the binary tree structure, and wherein a respective index signal indicates a number of times a corresponding entity has received access to the common resource;
   determine priority between the first and second requests by comparing the first and second priority signals, the first and second branch priority signals, and the first and second index signals; and
   send a request with the determined priority to a subsequent arbitration node at a subsequent level of the binary tree structure.

2. The arbitration node of claim 1, wherein the first priority signal and the second priority signal are set prior to arbitration in the binary tree structure based on a determined priority of requests of a previous clock cycle of arbitration.

3. The arbitration node of claim 1, wherein the first branch priority signal and the second branch priority signal are compared at the arbitration node at a level of the binary tree structure in response to both the first priority signal and the second priority signal being inactive or active.

4. The arbitration node of claim 3, wherein a request with an active branch priority signal is the determined priority.

5. The arbitration node of claim 4, wherein a branch priority signal of the determined priority is sent to the subsequent arbitration node at the subsequent level of the binary tree structure, wherein an active branch priority signal indicates which branch of the binary tree structure receives priority.

6. The arbitration node of claim 1, wherein the first index signal and the second index signal are compared at the arbitration node at the level of the binary tree structure in response to both the first branch priority signal and the second branch priority signal being active or inactive.

7. The arbitration node of claim 6, wherein a request with a lowest index signal is the determined priority.

8. The arbitration node of claim 7, wherein an index signal of the determined priority is sent to the subsequent arbitration node at the subsequent level of the binary tree structure.

9. A non-transitory machine readable storage medium having stored thereon machine readable instructions to cause a computer processor to:
   receive, at an arbitration node at a level of a binary tree structure from a first preceding arbitration node from a preceding level of the binary tree structure, a first request including a first priority signal, a first branch priority signal, and a first index signal, and receive, at the arbitration node at the level of the binary tree structure from a second preceding arbitration node from the preceding level of the binary tree structure, a second request including a second priority signal, a second branch priority signal, and a second index signal, wherein the first request and the second request are sent by respective first and second entities contending for a common resource;

wherein a respective priority signal indicates a priority of a corresponding request, wherein a respective branch priority signal indicates a priority of a corresponding branch of the binary tree structure, and wherein a respective index signal indicates a number of times a corresponding entity has received access to the common resource;

determine priority between the first and second requests by comparing the first and second priority signals, the first and second branch priority signals, and the first and second index signals; and send a request with the determined priority to a subsequent arbitration node at a subsequent level of the binary tree structure.

10. The machine readable storage medium of claim 9, wherein the first request is a determined priority of the first preceding arbitration node from the preceding level of the binary tree structure and the second request is a determined priority of the second preceding arbitration node from the preceding level of the binary tree structure.

11. The machine readable storage medium of claim 9, wherein at least one of the first preceding arbitration node, the second preceding arbitration node, the arbitration node, or the subsequent arbitration node use strict priority to determine the priority of requests.

12. The machine readable storage medium of claim 9, wherein at least one of the first preceding arbitration node, the second preceding arbitration node, the arbitration node, or the subsequent arbitration node use round robin priority to determine the priority of requests.

13. The machine readable storage medium of claim 9, wherein at least one of the first preceding arbitration node, the second preceding arbitration node, the arbitration node, or the subsequent arbitration node use first come, first served priority to determine the priority of requests.

14. A method comprising:
receiving, at an arbitration node at a level of a binary tree structure, a first request including a first priority signal, a first branch priority signal, and a first index signal, and receiving, at the arbitration node at the level of the binary tree structure, a second request including a second priority signal, a second branch priority signal, and a second index signal, wherein the first request and the second request are sent by respective first and second entities contending for a common resource;

wherein a respective priority signal indicates a priority of a corresponding request, wherein a respective branch priority signal indicates a priority of a corresponding branch of the binary tree structure, and wherein a respective index signal indicates a number of times a corresponding entity has received access to the common resource;

determining priority between the first and second requests by comparing the first and second priority signals, the first and second branch priority signals, and the first and second index signals; and sending a request with the determined priority to an output encoder to grant the request with the determined priority access to the common resource.

15. The method of claim 14, comprising setting the first priority signal and the second priority signal prior to arbitration in the binary tree structure based on a determined priority of requests of a previous clock cycle of arbitration.

16. The method of claim 14, comprising setting the first priority signal and the second priority signal after a clock cycle comprising a length of an arbitration process of the binary tree structure.

17. The method of claim 14, comprising setting the first priority signal and the second priority signal after a plurality of clock cycles each comprising a length of an arbitration process of the binary tree structure.

18. The method of claim 14, comprising setting the first priority signal and the second priority signal for a second clock cycle based on the request with the determined priority of a first clock cycle, where the first clock cycle and the second clock cycle each comprise a length of an arbitration process of the binary tree structure.

* * * * *